(12) United States Patent
Noordegraaf et al.

(10) Patent No.: US 9,521,814 B2
(45) Date of Patent: Dec. 20, 2016

(54) GROWTH SUBSTRATE FOR PLANTS

(71) Applicant: Synbra Technology B.V., Etten-Leur (NL)

(72) Inventors: Jan Noordegraaf, Wijchen (NL); Peter De Bruijn, Nijmegen (NL); Josephus Petrus Maria De Jong, Breda (NL); Karin Molenveld, Wageningen (NL); Kenneth Van Den Hoonaard, Wijchen (NL); Ton Baltissen, Heelsum (NL)

(73) Assignee: SYNBRA TECHNOLOGY B.V., Etten-Leur (NL)

( * ) Notice: Subject to any disclaimer, the term of this patent is extended or adjusted under 35 U.S.C. 154(b) by 265 days.

(21) Appl. No.: 14/353,668

(22) PCT Filed: Oct. 29, 2012

(86) PCT No.: PCT/NL2012/050749
§ 371 (c)(1),
(2) Date: Apr. 23, 2014

(87) PCT Pub. No.: WO2013/062416
PCT Pub. Date: May 2, 2013

(65) Prior Publication Data
US 2014/0259909 A1    Sep. 18, 2014

(30) Foreign Application Priority Data

Oct. 29, 2011    (NL) ...................................... 1039140

(51) Int. Cl.
*A01G 31/00* (2006.01)
*B29C 67/20* (2006.01)
*B29L 31/00* (2006.01)

(52) U.S. Cl.
CPC ............. *A01G 31/001* (2013.01); *B29C 67/20* (2013.01); *A01G 2031/003* (2013.01); *B29L 2031/7004* (2013.01); *Y02P 60/216* (2015.11)

(58) Field of Classification Search
CPC ............ A01G 31/001; A01G 2031/003; A01G 9/1086; A01G 2031/002; A01G 2031/007; B29C 67/20
See application file for complete search history.

(56) References Cited

U.S. PATENT DOCUMENTS

| 2,243,857 | A | * | 6/1941 | Fischer | ............... A01G 31/001 119/169 |
| 2006/0167122 | A1 | * | 7/2006 | Haraguchi | ................ C08J 9/00 521/60 |

(Continued)

FOREIGN PATENT DOCUMENTS

| EP | 1 365 641 B1 | | 9/2005 | |
| JP | 2000217683 | * | 8/2000 | ............... A47G 7/02 |

(Continued)

OTHER PUBLICATIONS

Machine translation of JP 2006-306983 to Yamanaka et al., dated Nov. 2006.*

(Continued)

*Primary Examiner* — Kathleen Alker
(74) *Attorney, Agent, or Firm* — Shumaker, Loop & Kendrick, LLP

(57) ABSTRACT

A growth substrate for plants including polylactic acid, wherein the polylactic acid is particulate polylactic acid foam. A method for preparing a growth substrate for plants including polylactic acid foam, the method including providing particulate expandable polylactic acid and exposing the particulate expandable polylactic acid to predetermined temperature and pressure conditions to obtain particulate polylactic acid foam.

8 Claims, 2 Drawing Sheets

(56) References Cited

U.S. PATENT DOCUMENTS

| | | | |
|---|---|---|---|
| 2008/0250711 A1* | 10/2008 | Everhardus Lucas Langezaal | A01G 9/1086 47/77 |
| 2009/0019765 A1* | 1/2009 | Kosinski | A01G 9/1086 47/64 |
| 2009/0076190 A1* | 3/2009 | Park | A01G 9/1086 523/123 |
| 2010/0087556 A1* | 4/2010 | Britton | C08J 9/0061 521/57 |
| 2010/0285962 A1* | 11/2010 | Hoffmann | A01G 9/1086 504/142 |
| 2011/0016780 A1 | 1/2011 | Furukawa et al. | |
| 2012/0077010 A1* | 3/2012 | Manesis | B29C 67/20 428/220 |
| 2012/0186150 A1* | 7/2012 | Yadav | A01G 9/1086 47/48.5 |
| 2012/0225967 A1 | 9/2012 | Amano et al. | |

FOREIGN PATENT DOCUMENTS

| | | | | |
|---|---|---|---|---|
| JP | 2001098105 A | * | 4/2001 | C08J 9/236 |
| JP | 2003064213 A | * | 3/2003 | C08J 9/228 |
| JP | 2006306983 A | * | 11/2006 | C08J 9/26 |
| JP | 2010070711 | * | 4/2010 | C08J 9/04 |
| NL | 2 000 327 C2 | | 5/2008 | |
| WO | 2009011905 A1 | | 1/2009 | |
| WO | 2010028037 A2 | | 3/2010 | |
| WO | 2011/062224 A1 | | 5/2011 | |

OTHER PUBLICATIONS

European Patent Office Search Report for PCT/NL2012/050749 dated Mar. 1, 2013.

* cited by examiner

GROWTH SUBSTRATE FOR PLANTS

TECHNICAL FIELD AND BACKGROUND OF THE INVENTION

The present invention relates to a growth substrate comprising polylactic acid. The present invention further relates to a method for preparing the growth substrate.

In the tree nursery industry and in greenhouse farming, substrate (such as potting compost) is frequently used as a medium for cultivating plants. This concerns especially the cultivation in pots under glass and the cultivation of avenue trees in containers. The substrates that are used for this mainly consist of coarser parts of broken-up peat, which is used for making the soil airy.

The use of peat in horticulture is controversial, inter alia on account of the loss of biotopes caused by the extraction of peat and the emission of carbon dioxide during extraction, transport and decomposition. In addition, usable peat, such as black peat, is becoming scarcer and scarcer. Estimates are that the supply of natural peat only suffices for another 15 years of use. Furthermore, peat is a raw material which is only renewable to a limited extent, which is an undesirable property.

Another growth substrate that is used in horticulture is rock wool. Rock wool is a very costly growth substrate, however. Another drawback of these substrates is that they may constitute a health hazard, since dust particles from these substrates accumulate in the lungs upon inhalation. Another drawback is that this material is difficult to decompose.

In horticulture there is a continuous demand for renewable growth substrates which exhibit advantageous properties as regards the growth of plants and which can be discharged in a simple manner after use.

WO 2010/028037, WO 2009/011905 and NL 1017480 disclose growth substrates that may comprise polylactic acid.

WO 2010/028037 discloses a substrate based on polymer fibres, such as polylactic acid fibres. WO 2009/011905 discloses substrates based on fibre balls. Said fibres may comprise polylactic acid.

NL 1017460 discloses a growth medium which can be based on foamed polylactic acid. The substrate according to NL 1017460 is obtained by extrusion foaming. In this process, a blowing agent is added to the extruder and the polymer is foamed directly upon exiting the extruder as a result of the pressure difference inside and outside the extruder. A drawback of extrusion foaming is that only one shape is possible and that the shape and the dimensions thereof depend on the extruder. Furthermore it is very difficult to control the porosity of the substrate to be obtained such that the required porosity or approximately the required porosity is actually achieved.

BRIEF SUMMARY OF THE INVENTION

Thus it is an object of the present invention to provide a growth substrate which is renewable, whose base material is not scarce, which has advantageous properties as regards the growth of plants and whose use does not have any adverse effects on nature and the environment.

Another object of the present invention is to provide a substrate which can be prepared in various forms thereof.

Another object of the present invention is to provide a method for the preparation of a growth substrate which is renewable, whose base material is not scarce, which has advantageous properties as regards the growth of plants and whose use has not have any adverse effects on nature and the environment.

One or more of the above objects are achieved by the present invention in that it provides a growth substrate as described in the introduction, which is characterised in that the polylactic acid is particulate polylactic acid foam.

Polylactic acid (PLA) is a renewable biodegradable material which is used, inter alia, in the packaging industry. Polylactic acid is a collective term for polymers based on lactic acid monomers, the structure of which polylactic acid can vary from completely amorphous via semi-crystalline to crystalline, depending on the composition. Polylactic acid can be produced from milk products or from maize, for example.

Lactic acid is the monomer of which polylactic acid is composed, and this monomer exists in two stereoisomers, viz. L-lactic acid and D-lactic acid. Polylactic acid thus contains a certain proportion of L-lactic acid monomers and a certain proportion of D-lactic acid monomers. The ratio between the L and D lactic acid monomers in polylactic acid determines its properties. Also terms such as D-value or D-content are used. They refer to the percentage of D-lactic acid monomers in the polylactic acid. The polylactic acid that is currently commercially available has an L-D ratio ranging between 100:0 and 75:25; put differently, a D-content ranging between 0 and 25% or, in other words, between 0 and 0.25. If polylactic acid contains more than about 12% D-lactic acid, it can no longer crystallise and is fully amorphous, therefore. If the D-content is at most 5%, the polylactic acid is referred to as semi-crystalline. The crystallinity of the polylactic acid can be determined by differential scanning calorimetry (DSC). The term "semi-crystalline" is understood to mean that the polymer can crystallize and that it can also melt. Thus it can be stated that the lower the D-content the higher the crystallinity of the polylactic acid. The D-content is generally determined by a known method, such as a so-called R-lactate determination, using gas-liquid chromatography (GLC) after complete hydrolysis of the polymer. Another standard method is a determination via optical rotation (measured in chloroform using a Jasco DIP-140 polarimeter at a wavelength of 589 nm).

The present inventors have found that a growth substrate which comprises particulate polylactic acid foam is a growth substrate which is renewable, whose base material is not scarce, which has advantageous properties as regards the growth of plants and whose use has not have any adverse effects on nature and the environment. Because the lactic acid is foamed, it can readily absorb and give off moisture and any substances that may be conducive to the growth of plants. The structure of the particulate polylactic acid enables plants to root well and the substrate provides the plant with sufficient strength to grow.

The present inventors have found that particulate polylactic acid foam has advantageous properties which render it suitable for use as a growth substrate. Particulate polylactic acid foam thus has a good water-retaining capacity, it quickly absorbs water, it has a good airiness and it is quite capable of retaining nutrients.

Another advantage of a growth substrate according to the invention is that the properties of the polylactic acid can be adapted to the growth conditions, which vary with each type of plant, or to the specific requirements in the cultivation of a specific type of plant.

Another advantage of the particulate polylactic acid foam is that various forms can be chosen in the preparation thereof. Thus, loose particles of polylactic acid foam can be prepared, which can subsequently be used as loose particles in the substrate. The advantage of this is that the particles can be mixed with, for example, earth or peat. Another option is for the particles to be compressed (also referred to as "fused") to a desired shape. Upon compression it is possible to control the porosity of the substrate to be obtained. This makes it possible to produce substrates for different plants or to meet the specific requirements in the cultivation of a specific type of plant. Thus, the substrate according to the invention can be prepared in the form of a pot or be made plate-shaped, for example.

The term "particulate polylactic acid foam" is thus understood to mean not only the polylactic acid foam in the form of loose particles, but also the substrate that is obtained by compressing/fusing the loose polylactic acid foam particles. The term "particulate polylactic acid foam" is thus understood to mean polylactic acid foam in the form of particles or granules as well as all the moulded parts formed by the fusing of the polylactic acid foam particles.

BRIEF DESCRIPTION OF THE DRAWINGS

The present invention will now be discussed in more detail with reference to a number of preferred embodiments and figures.

DETAILED DESCRIPTION OF THE INVENTION

Figure 1:
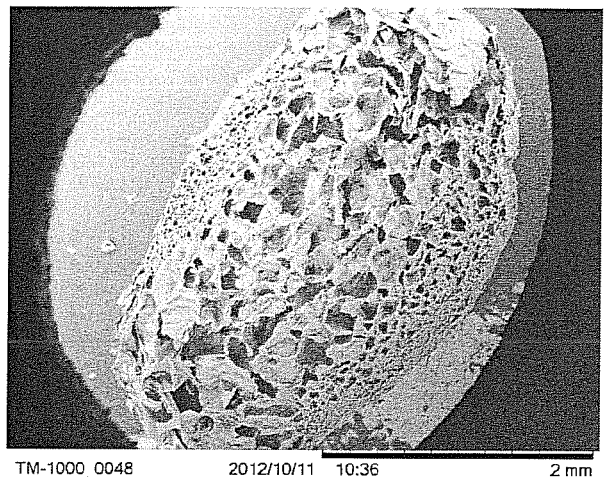
FIG. 1 shows a polylactic acid foam particle having an open-cell structure or a closed-cell structure.

The growth substrate according to the present invention preferably comprises 10-100 wt. % of particulate polylactic acid foam in relation to the total weight of the substrate. The present inventors have found that when such a percentage of polylactic acid foam is used, the result will be a good growth substrate exhibiting advantageous properties as regards the growth of plants and seeds, such as a good airiness.

The particulate polylactic acid foam that can be used in the growth substrate according to the present invention may be amorphous or semicrystalline polylactic acid or a mixture of the two. Polylactic acid is commercially available as amorphous or semicrystalline polylactic acid under the brand name Ingeo™ (for example Ingeo™ 6060D, Natureworks) or Synterrae (for example Synterra PLLA 1510, Synbra Technology BV).

It is also possible to mix the polylactic acid with other (biodegradable) polymers, and/or fillers. Examples of this are a copolyester of butanediol, adipinic acid and terephthalic acid (available from BASF under the name Ecoflex), starch, chalk, starch, flour, kaolin, or cellulose.

In one embodiment of the present invention, the filler is selected from the group comprising lime, cellulose, talcum, chalk, mica, graphite, soot, active carbon and carbon. One or more of the above materials can be added to the growth substrate so as to make it more porous and/or heavier. This makes it possible to adapt the properties of the growth substrate to the optimum growth conditions of a particular type of plant.

In embodiment of the present invention, the growth substrate further comprises polylactic acid fibres. Due to their structure, such forms of polylactic acid have advantageous properties for use as a growth substrate. Polylactic acid fibres are spun by causing the liquid polylactic acid to flow through a small-diameter mould and extruding it into a fibre. Subsequently, the fibre is directly cooled with compressed air.

The growth substrate may further comprise recycled polylactic acid. By recycling polylactic acid, the burden on the environment is reduced. The recycled polylactic acid may be obtained from packaging materials, for example. By using said packaging material in the growth substrate, said material is not lost unnecessarily.

The growth substrate according to the present invention may comprise an additional material selected from natural material, non-natural material or a combination thereof. Preferably, the natural material is selected from the group comprising earth, coco peat, perlite, vermiculite, starch and starch foam, natural fibres based on hemp, grass, cellulose, reed, hay, straw and cardboard. The non-natural material is preferably selected from the group comprising rock wool, glass wool, polyurethane foam, paper foam, polypropylene foam, polyethylene foam. By adding other materials to the growth substrate it becomes possible to obtain a growth substrate which has properties that are advantageous for a particular type of plant. Thus, it is possible to add a material which increases the porosity of the substrate and/or a material which increases the strength of the substrate.

In one embodiment of the present invention, the growth substrate comprises one or more nutrients, based on N, P, Ca or S, fillers, binders, colorants, preservation agents, nutriments, plant protection products (herbicides, pesticides, fungicides) or combinations thereof. The nutrients and nutriments are important to the growth of the plant. The amounts of certain nutrients and new treatments can be adapted in dependence on the plant to be cultivated on the growth substrate, so that an optimum nutrient medium is obtained. Plant protection products can be added for preventing fungal infections or insect plagues, for example. Preservation agent can be added for Increasing the storage life of the growth substrate, for example. Said agents can be absorbed by the particulate polylactic acid foam together with water, for example.

The particulate polylactic acid foam preferably has a closed-cell or an open-cell structure. This structure inter alia enables the polylactic acid foam to absorb and give off sufficient water and substances that are conducive to the growth of plants. A very good absorption and giving off of water was observed with particulate polylactic acid foam having an open-cell structure. It is preferable, therefore, for the particulate polylactic acid foam to have an open-cell structure.

In one embodiment of the present invention, open-cell polylactic acid foam is obtained by mixing polylactic acid with water-soluble additives such as polyethylene glycol, sucrose, glucose, flour and starch. During or after foaming, said additives can be washed out, at a result of which holes are formed in the closed-cell structure and open cells having good water absorption properties are again obtained.

In one embodiment of the present invention, the polylactic acid is obtained from particulate polylactic acid. As already discussed in the foregoing, polylactic acid is biodegradable.

In one embodiment, the particulate polylactic acid foam is coated with a coating. In order to prevent the substrate becoming non-biodegradable as a result of the presence of the coating, it is preferable for the coating to be biodegradable as well.

The coating is preferably selected from the group consisting of polyvinyl acetate, polyvinyl acetate-based polymer, polyvinyl alcohol, polycaprolactone, polyester, polyester amide, protein-based material, polysaccharide, natural wax or fat and acrylate or one or more combinations thereof. The coating may also be amorphous polylactic acid or a combination thereof with the other coatings.

Examples of a coating based on polyvinyl acetate and polyvinyl acetate-based polymers are Vinnex and Vinnapas polymers from Wacker Chemie.

The present invention further relates to a use of particulate polylactic acid as a growth substrate for plants. The growth substrate is preferably a growth substrate according to the present invention as discussed in the foregoing.

The present invention further relates to a method for the preparation of a particular to growth substrate for plants comprising polylactic acid, which method comprises the steps of:

i) providing particulate expandable polylactic acid;

ii) placing the particulate expandable polylactic acid obtained in step i) under specific temperature and pressure conditions, so that particulate polylactic acid foam is obtained.

Using such a method, the growth substrate according to the present invention is obtained. After carrying out step ii), loose particles of polylactic acid foam are obtained.

In one embodiment of the present invention, particulate expandable polylactic acid foam impregnated with a blowing agent is provided in step i). The blowing agent is preferably selected from MTBE, nitrogen, air, (iso) pentane, propane, butane and the like or one or more combinations thereof. The blowing agent is preferably $CO_2$.

The method according to the present invention may further comprise one or more of the following steps:

iii) adjusting the call structure of the particulate polylactic acid foam by break-foaming the cell structure or washing out water-soluble additives; and/or iv) providing the foamed particulate polylactic acid with a coating.

By using at least step iii), a particulate polylactic acid foam having an open-cell structure is obtained.

By using at least step iv), coated particulate polylactic acid foam having the aforesaid advantages can be obtained. In the method according to the invention, the particulate polylactic acid is preferably provided with a coating prior to step i) by placing the particulate polylactic acid into contact with a liquid; preferably, the particulate polylactic acid is placed into contact with a liquid that comprises fertilizer, nutrients, mineral-based growth-stimulating additives or combinations thereof. The presence of fertilizer, nutrients and/or mineral-based growth-stimulating additives provides the substrate being prepared with sufficient nutrient value for growing a plant thereon.

The method according to the invention may further comprise the following steps:

v) compressing the material obtained in step iv) so that a plate-shaped growth substrate is obtained;

vi) selectively forming a moulded part, thus creating a more porous or less porous moulded part that is suitable for use as a growth substrate.

Such a substrate is advantageously suitable for use in hydroculture. Because the porosity of the moulded parts can be influenced during the preparation thereof, it is possible to produce substrates exhibiting different degrees of porosity. This makes it possible to produce substrates exhibiting different degrees of water permeability and airiness. The latter two are parameters that differ for the growth of different plant types.

The obtained moulded part of particulate polylactic acid foam is thus an object obtained by fusing loose particles of particulate polylactic acid foam. The advantage is that it is possible, using a method according to the invention, to obtain a moulded part having a required shape by causing the particles of particulate polylactic acid to fuse. In prior art methods, on the other hand, it is only possible to obtain a shape as allowed by the extruder. Thus only foam plates obtained by extrusion foaming are obtained in NL 1017460. Said plates are not based on particulate polylactic acid foam, therefore.

In one embodiment of the present invention, the particulate polylactic acid foam is mixed with an additional material. Said additional material is preferably selected from natural material, non-natural material or a combination thereof; the natural material is preferably selected from the group comprising earth, peat, cocopeat, periite, vermiculite, starch and starch foam, natural fibres based on hemp, grass, cellulose, reed, hay, straw and cardboard; the non-natural material is preferably selected from the group comprising rock wool, glass wool, polypropylene foam, polyethylene foam. This advantageously results in a growth substrate according to the present invention.

In the method according to the invention, the particulate polylactic acid foam is preferably mixed with a filler. The filler can be selected from lime, cellulose, talcum, chalk, mica, graphite, soot, active carbon and carbon. One or more of the above materials can be mixed with the polylactic acid so as to make it more porous and/or heavier. This makes it possible to adapt the properties of the growth substrate to the optimum growth conditions of a particular type of plant.

If particulate, expandable polylactic acid is provided with a coating, a good fusion between the particles will occur if, for example, formed moulded parts are made. If a good fusion is required, the coating is preferably selected from polyvinyl acetate, polyvinyl acetate-based polymer, polyvinyl alcohol, polycaprolactone, polyester, polyester amide, protein-based material, polysaccharide, natural wax or fat and acrylate or one or more combinations thereof. The coating may also be amorphous polylactic acid or a combination thereof with the other coatings.

The present invention thus makes it possible to grow a plant on a growth substrate that comprises particulate polylactic acid foam. Preferably, the growth substrate is the substrate according to the present invention as discussed in the foregoing. The advantage of this method is that a growth substrate is used which is renewable, whose base material is not scarce, which has advantageous properties as regards the growth of plants and whose use does not have any adverse effects on nature and the environment.

Using a method in which a seed, a cutting, a plant or another vegetable material is provided, for example planted or sown, to a substrate according to the invention, it is thus possible to obtain a tree, a bush, a flower or a foodcrop. Preferably, a tree, a bush, a flower or a foodcrop is concerned.

The present invention further relates to a use of particulate polylactic acid foam as a growth substrate for a plant. One or more of the above embodiments can be used in this regard.

The present invention will now be explained by means of a number of examples. Said examples must not be construed as being limitative. The claims included after the examples also form part of the present disclosure.

EXAMPLES

Example 1

Particulate expandable polylactic acid was obtained by extruding Synterra BF 1505, a copolymer based on 95% L-lactide and 5% D-lactide having a molecular weight of 150 kDA (Mn, measured versus PS) on a Berstdorff ZE75A extruder and converting it into micro-granulate. The micro-granulate was subsequently impregnated with $CO_2$ under high pressure, after which it was expanded to form polylactic acid foam, using steam. The particulate polylactic acid foam obtained in this manner has an open-cell structure or a closed-cell structure (see FIGS. 1 and 2), depending on the foaming conditions. An open-cell structure is preferred, because it has a positive effect on the water absorption and desorption of the polylactic acid foam.

Example 2

Loose granules of polylactic acid foam from example 1 were mixed with earth, after which the growth of various plants in pots and gutters was evaluated. The stability of the polylactic acid foam appeared to be comparable to that of fresh coconut. A growth test in a gutter system with various crops (whips (young trees)) showed that the growth of the crops was comparable to that on standard substrate.

Figure 3:
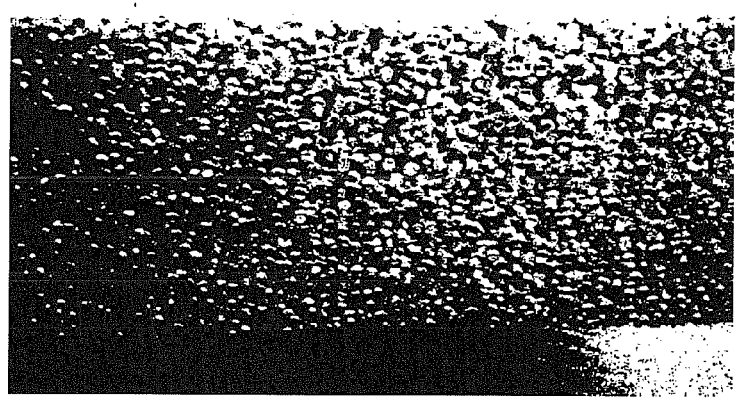
FIG. 3 shows a plate obtained by the fusing of polylactic acid foam granules.

Furthermore, plates (shown in FIG. 3) obtained by causing granules of polylactic acid-foam to fuse were used as a growth substrate for aubergine plants. The aubergine plants exhibited good growth.

Example 3

Figure 4:
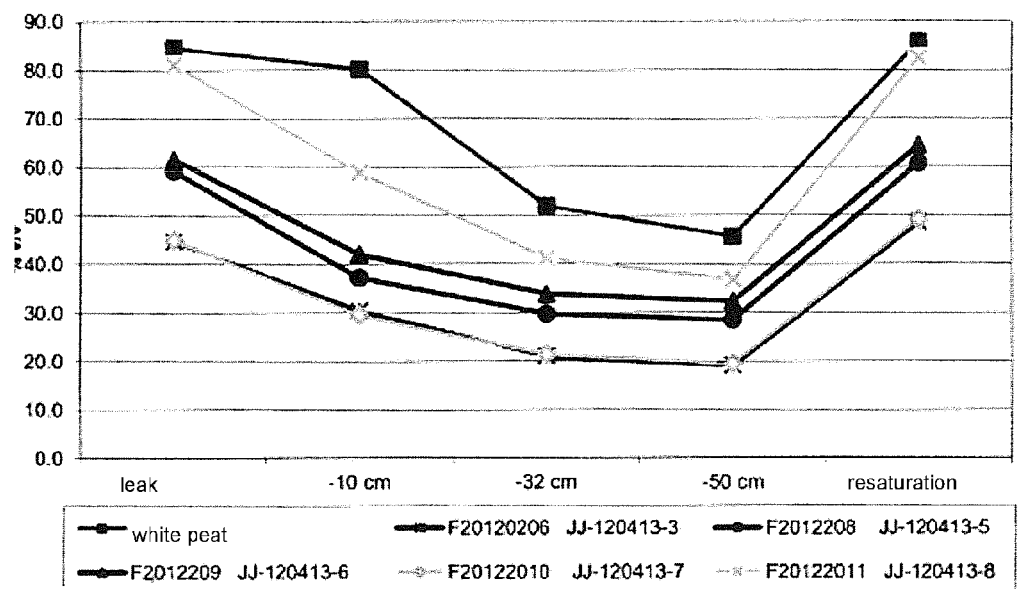
FIG. 4 is a diagram in which the water retention of the various substrates is shown.

Particulate expandable polylactic acid was obtained by mixing Synterra BF 1505, a copolymer based on 95% L-lactide and 5% D-lactide having a molecular weights of 150 kDA (Mn, measured versus PS) with a number of water-soluble additives (ingredient 3 in Table 1) on a Berstdorff ZE75A extruder. The micro-granulate thus obtained was impregnated with $CO_2$ in a pressure vessel and expanded, using steam. During the expanding process, the water-soluble additives dissolved, resulting in an open-cell structure. The particulate polylactic acid (pPLA in FIG. 1) foam obtained in this manner was evaluated for water retention. In FIG. 4, the water retention is expressed in volume of water/volume of substrate %. The description of the measured samples is given in Table 1. Samples 1 and 7 are the control samples without particulate polylactic acid foam. Samples 2-6 are mixtures of 50% potting compost (ingredient 1) and 50% particulate polylactic acid foam (ingredient 2). The potting compost used is a mixture of 50% bog moss (0-40 mm), 25% fibre mix (sieved-out white and black peat fibre) and 25% GreenFibre (fiberized wood chips from *Pinus*, *Larix* and *Picae*), with the pH stabilised at 5.5.

The particles of each sample were evaluated by their exterior as: very fine, fine or coarse.

TABLE 1

Figure 2:
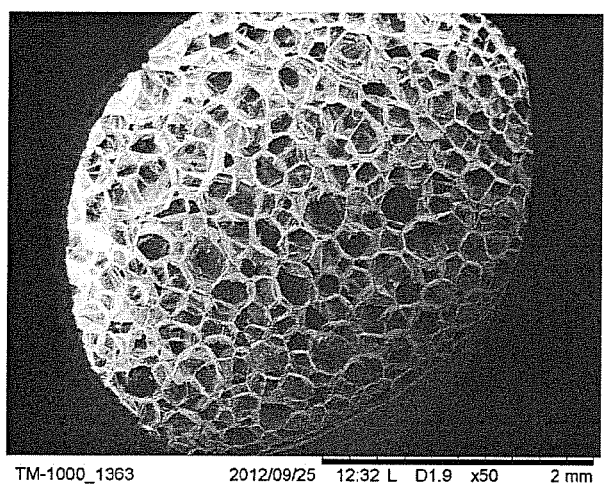
FIG. 2 shows a polylactic acid foam particle having a closed-cell structure.

Formulations used for the tests in FIG. 1

| Sample | Ingredient 1 | Ingredient 2 | Ingredient 3 | Evaluation particles |
|---|---|---|---|---|
| 1 | White peat | | | |
| 2 | potting compost | pPLA | | coarse |
| 3 | potting compost | pPLA | | |
| 4 | potting compost | pPLA | 13% sucrose | fine |
| 5 | potting compost | pPLA | 16% PEG 3500 | very fine |
| 6 | potting compost | pPLA | 10% starch | coarse |
| 7 | potting compost | | | |

From the results it appears that the various mixtures of particulate polylactic acid foam and potting compost absorb water well, and that the water absorption improves as finer particles are used. From these results it appears that particulate polylactic acid is suitable for use as a growth substrate for plants and that the water absorption can at least be influenced by the degree of coarseness of the particles.

The examples show that particulate polylactic acid foam in combination with peat or earth is suitable for use as a substrate for plants. It has further been shown that plate-shaped particulate polylactic acid can function as a growth substrate.

The invention claimed is:

1. A method for preparing a growth substrate for plants comprising polylactic acid foam, the method comprising the steps of:
   i) providing particulate expandable polylactic acid;
   ii) mixing the particulate expandable polylactic acid of step i) with water-soluble additives;
   iii) placing the mixture obtained in step ii) under specific temperature and pressure conditions, so that particulate polylactic acid foam is obtained; and
   iv) adjusting the cell structure of the particulate polylactic acid foam by washing out the water-soluble additives.

2. The method according to claim 1, further comprising the step of:
   iv) providing the foamed particulate polylactic acid with a coating thereby forming a coated foamed particulate polylactic acid.

3. The method according to claim 2, further comprising the steps of:
   v) compressing the coated foamed particulate polylactic acid obtained in step iv) to obtain a plate-shaped growth substrate; and
   vi) forming a molded part from the compressed growth substrate.

4. The method according to claim 1, wherein the particulate expandable polylactic acid is impregnated with a blowing agent.

5. The method according to claim 4, wherein the blowing agent is $CO_2$.

6. The method according to claim 1, wherein the particulate polylactic acid is mixed with a material selected from the group consisting of natural material, non-natural material and a combination thereof.

7. The method according to claim 6, wherein the natural material is selected from the group consisting of earth, peat, cocopeat, perlite, vermiculite, starch and starch foam, natural fibers based on hemp, grass, cellulose, reed, hay, straw and cardboard.

8. The method according to claim 6, wherein the non-natural material is selected from the group consisting of rock wool, glass wool, polypropylene foam and polyethylene foam.

* * * * *